No. 773,152. PATENTED OCT. 25, 1904.
C. C. LONGARD.
HOT WATER HEATER.
APPLICATION FILED AUG. 17, 1903.
NO MODEL. 6 SHEETS—SHEET 1.
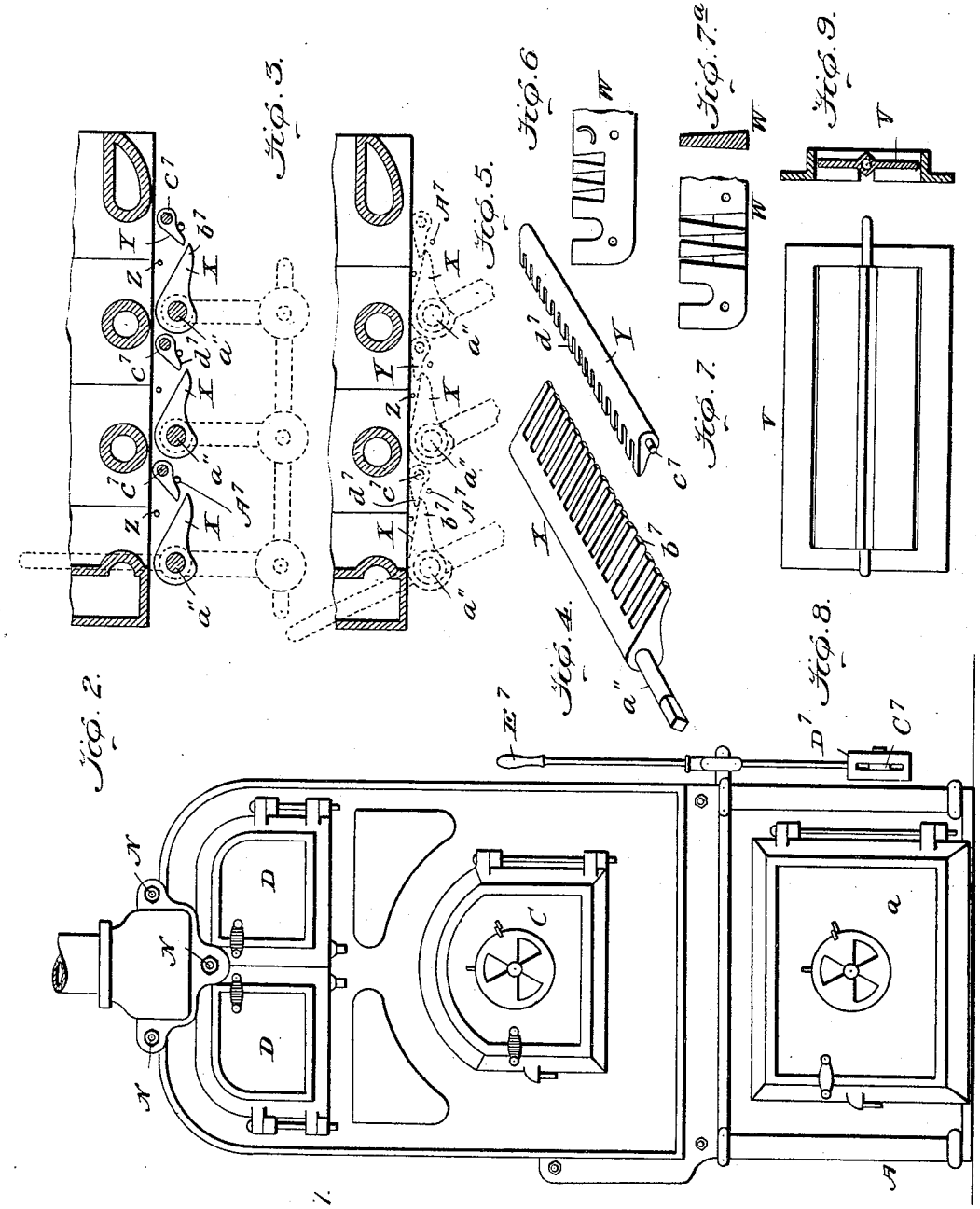
WITNESSES: INVENTOR
C. C. Longard.
BY
James J Shuhy
Attorney No. 773,152. PATENTED OCT. 25, 1904.
C. C. LONGARD.
HOT WATER HEATER.
APPLICATION FILED AUG. 17, 1903.
NO MODEL. 6 SHEETS—SHEET 2.
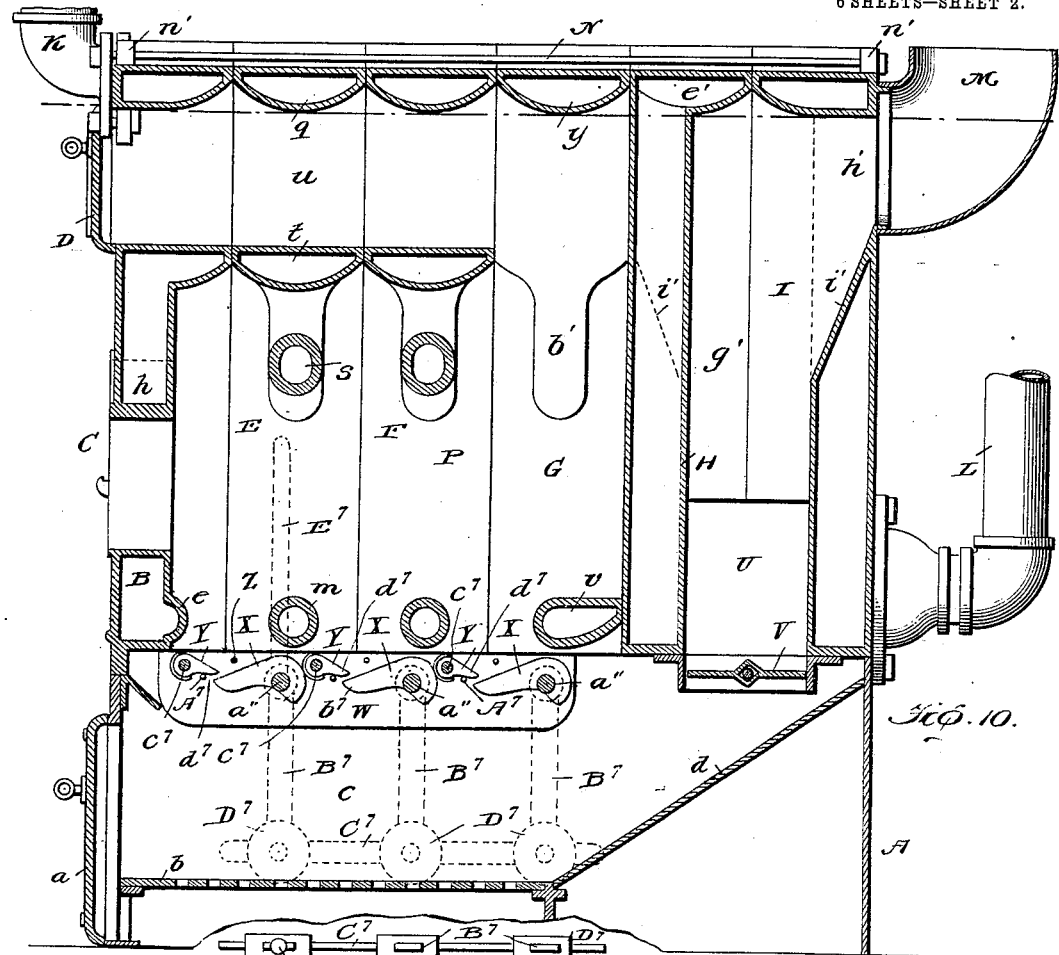
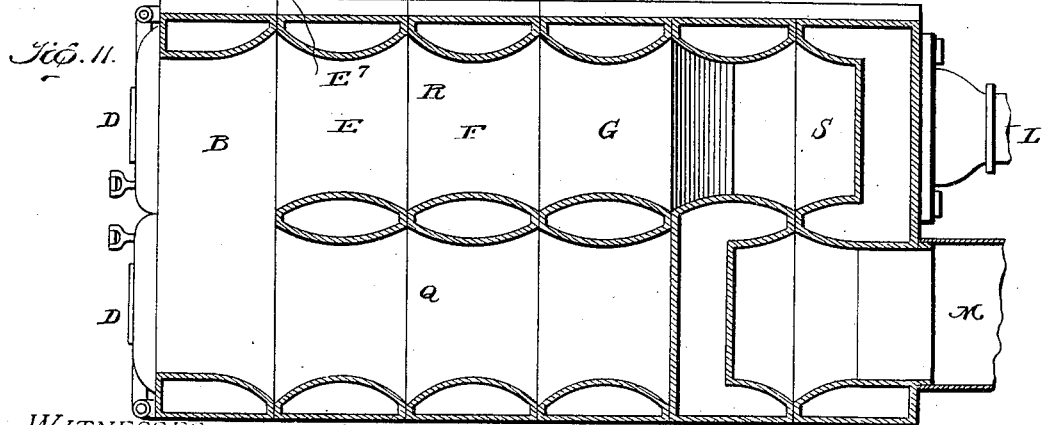
WITNESSES: INVENTOR
C. C. Longard.
BY James J. Shuly
Attorney No. 773,152. PATENTED OCT. 25, 1904.
C. C. LONGARD.
HOT WATER HEATER.
APPLICATION FILED AUG. 17, 1903.
NO MODEL. 6 SHEETS—SHEET 3.
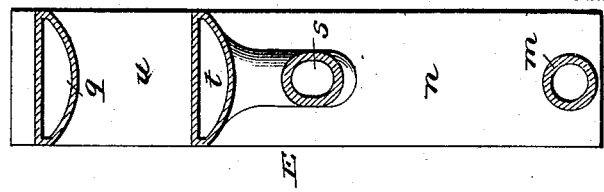
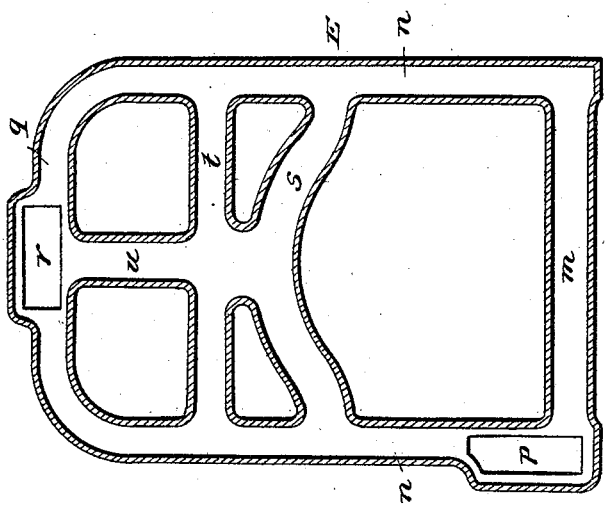
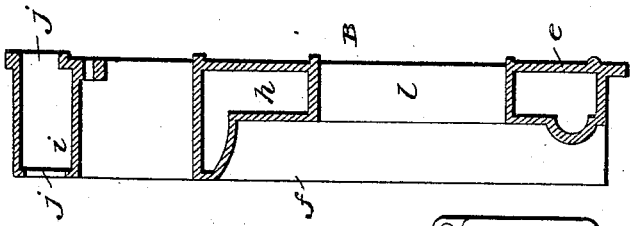
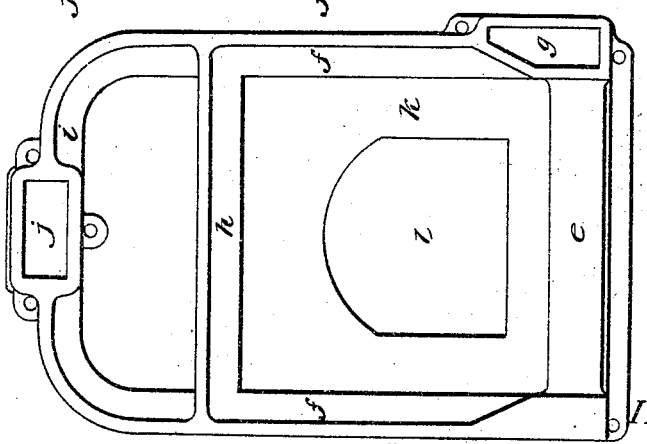
WITNESSES: 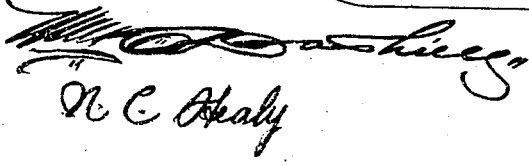 INVENTOR
C. C. Longard
BY 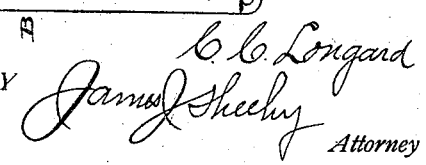
Attorney No. 773,152. PATENTED OCT. 25, 1904.
C. C. LONGARD.
HOT WATER HEATER.
APPLICATION FILED AUG. 17, 1903.
NO MODEL. 6 SHEETS—SHEET 4.
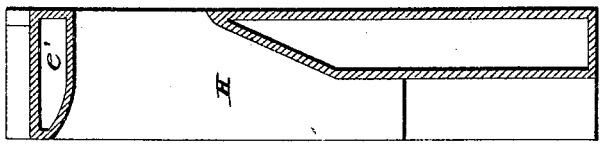
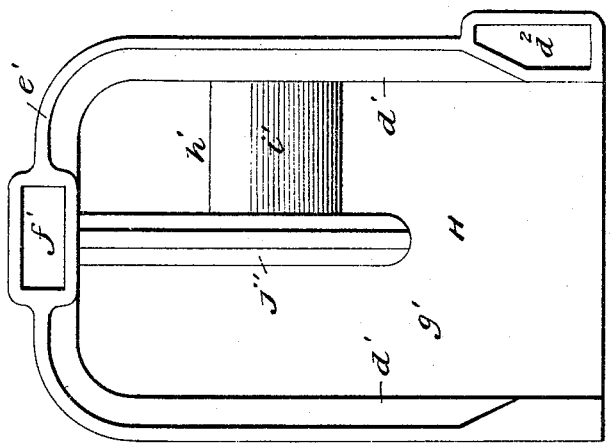
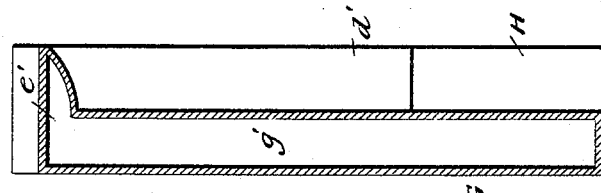
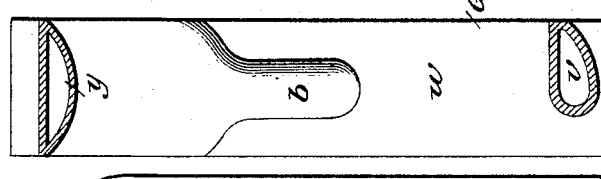
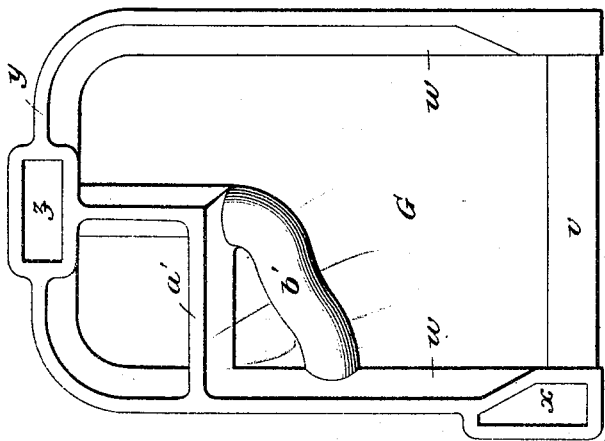
Witnesses Inventor
C. C. Longard
By James J. Sheehy
Attorney

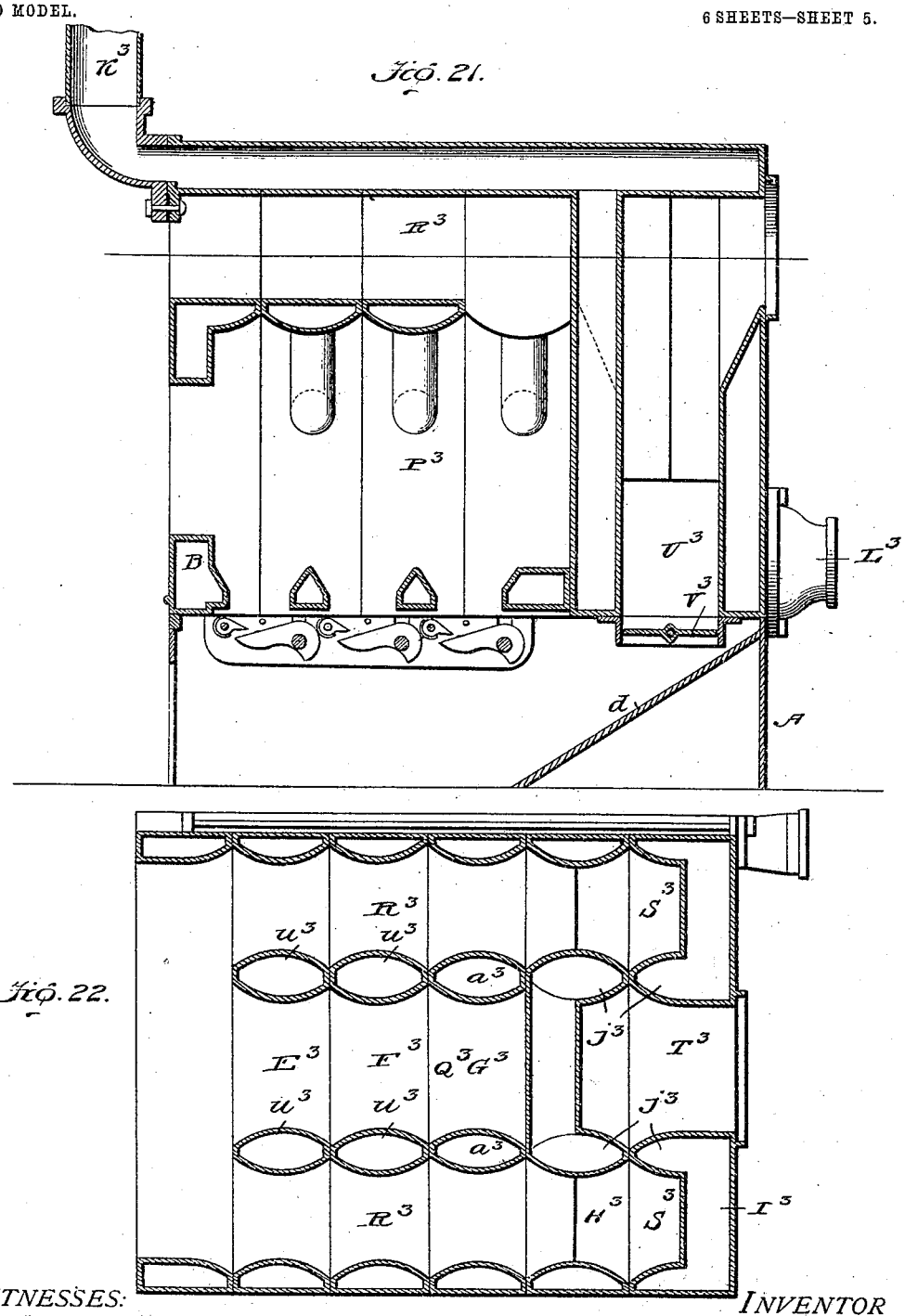

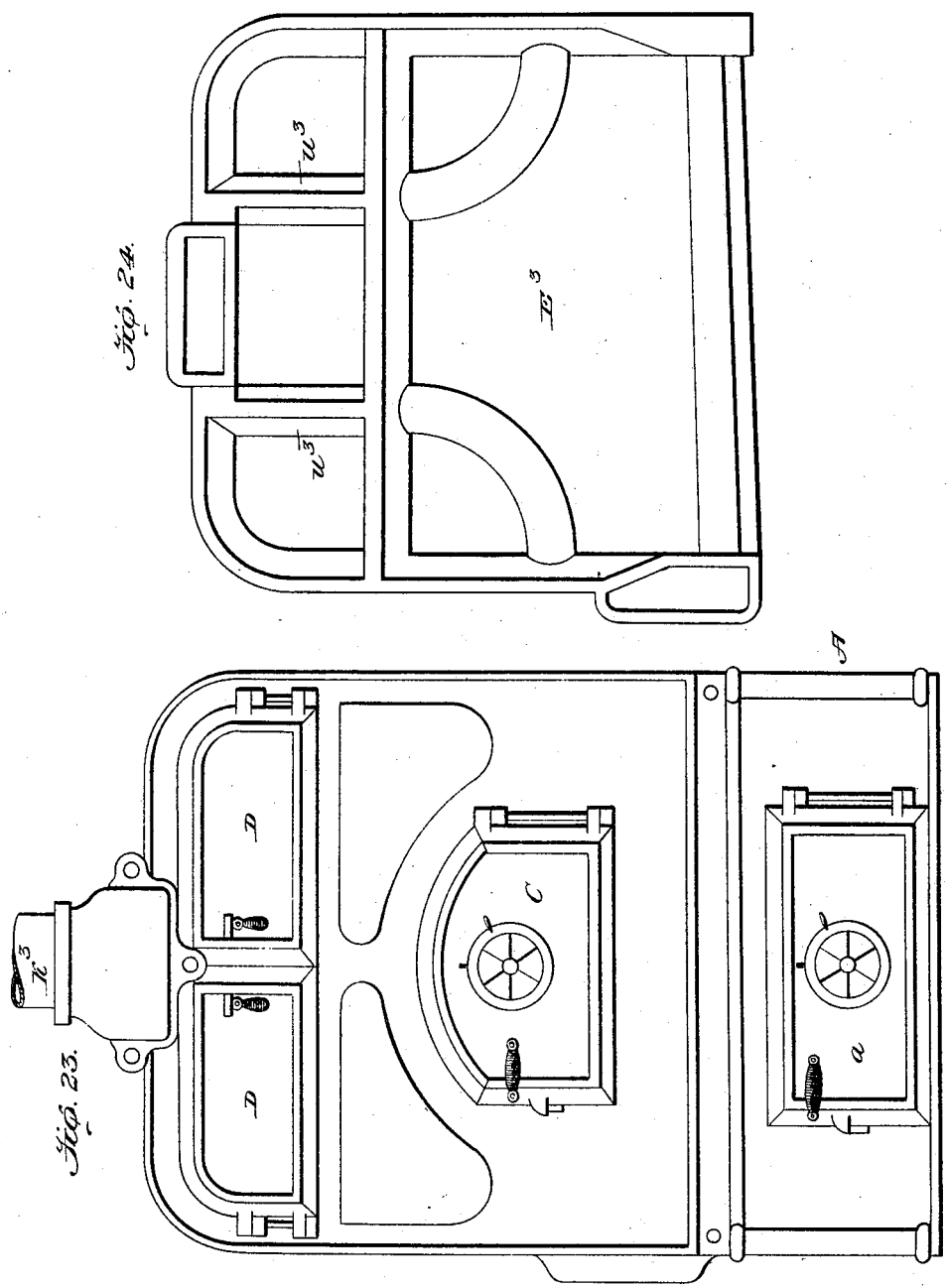

No. 773,152.

Patented October 25, 1904.

UNITED STATES PATENT OFFICE.

CLARENCE C. LONGARD, OF HALIFAX, CANADA.

HOT-WATER HEATER.

SPECIFICATION forming part of Letters Patent No. 773,152, dated October 25, 1904.

Application filed August 17, 1903. Serial No. 169,820. (No model.)

*To all whom it may concern:*

Be it known that I, CLARENCE C. LONGARD, a citizen of Canada, residing at Halifax, in the Province of Nova Scotia and Dominion of Canada, have invented new and useful Improvements in Hot-Water Heaters, of which the following is a specification.

My invention pertains to hot-water heaters or boilers, and has for one of its objects to provide a heater or boiler which, while simple and compact in construction, is possessed of a very large heating-surface, and is therefore highly efficient in operation.

Another object of the invention is to provide an improved hot-water heater or boiler comprising a plurality of hollow cast-metal water-holding sections, any one of which may be readily removed when impaired and replaced with a new section without detriment to the other sections.

Another object is to provide a hot-water heater or boiler embodying an improved grate calculated to enable an operator to keep the fire clean and bright with but a minimum amount of effort and without loss of fire.

With the foregoing in mind the invention will be fully understood from the following description and claims when taken in connection with the accompanying drawings, in which—

Figure 1 is a front elevation of a water-heater constituting one embodiment of my invention. Figs. 2 and 3 are detail sections of the improved grate with the rocking members thereof in different positions. Fig. 4 is a perspective view of one of the large rocking members of the grate. Fig. 5 is a similar view of one of the small rocking members of the grate. Figs. 6 and 7 are detail broken views of opposite sides of the bars in which the rocking members of the grate are mounted. Fig. 7ª is a cross-section of one of the said bars. Fig. 8 is a plan view, and Fig. 9 a cross-section, of a damper embodied in the heater and hereinafter referred to. Fig. 10 is a longitudinal vertical section of the heater, taken in a plane at one side of the longitudinal median line thereof. Fig. 11 is a horizontal section of the same. Fig. 12 is a rear elevation, and Fig. 13 a vertical central section, of the front water-holding section of the heater. Figs. 14 and 15 are sections taken at right angles to each other and illustrating one of the intermediate water-holding sections of the heater. Figs. 16 and 17 are a rear elevation and a central vertical section, respectively, of another intermediate water-holding section. Fig. 18 is a vertical section, Fig. 19 a rear elevation, and Fig. 20 a vertical section in a different plane from Fig. 18, of still another intermediate water-holding section. Fig. 21 is a longitudinal vertical section of a modified embodiment of my invention. Fig. 22 is a horizontal section of the same. Fig. 23 is a front elevation of said modification, and Fig. 24 is a front elevation of one of the intermediate water-holding sections thereof removed.

Referring by letter to said drawings, and more particularly to Figs. 1 to 20 thereof, A is the base of my improved heater, which is preferably of cast metal and rectangular in form. Said base is provided with an ash-door *a* and contains a horizontal foraminated plate *b*, which forms the floor of an ash-pit *c*, and a plate *d*, which is inclined upwardly from the rear end of the plate *b* for a purpose presently described.

B is the front water-holding section of the heater, which also constitutes part of the front wall thereof. This section comprises, as best shown in Figs. 10, 12, and 13, a lower hollow cross-bar *e*, hollow side bars *f*, one of which has an opening *g* in its rear side, an intermediate hollow cross-bar *h*, an upper hollow cross-bar *i*, having openings *j* in its front and rear walls at its middle, and a plate *k*, extending between the bars *e*, *f*, and *h* and having an opening *l* for the introduction of fuel. On its front the said section is provided with a fire-door C and doors D, the latter to permit of access being readily gained to flues hereinafter described.

E is the intermediate water-holding section next to the front section B, and F the intermediate section in rear of the section E. These sections E and F are similar in construction, and therefore a detailed description of the section E (shown in Figs. 14 and 15) will suffice to impart an understanding of both. Said section E comprises a lower hollow cross-bar $m$, hollow side bars $n$, one of which has openings $p$ in its front and rear walls, an upper hollow cross-bar $q$, having openings $r$ in its front and rear walls, intermediate hollow cross-bars $s$ $t$, and a central vertical hollow bar $u$, connecting the cross-bars $s$, $t$, and $q$.

G is the intermediate water-holding section in rear of the section F. This section G comprises a lower hollow cross-bar $v$, Fig. 16, hollow side bars $w$, one of which has openings $x$ in its front and rear walls, an upper hollow cross-bar $y$, having openings $z$ in its front and rear walls at its middle, an angular hollow bar $a'$, interposed between one of the side bars and the upper cross-bar, and a hollow bar $b'$, interposed between the said side bar and the apex of the angular bar.

H, Figs. 18 to 20, is the intermediate water-holding section back of the section G. Said section H comprises hollow side bars $d'$, one of which has openings $d^2$ in its front and rear walls, an upper hollow cross-bar $e'$, having openings $f'$ in its front and back walls at its middle, and a hollow upright portion $g$, which extends throughout the height of the section and has an opening $h'$, the lower wall $i'$ of which is beveled, and a rearward projection $j'$, extending down from the upper cross-bar $e'$ to about the intermediate point in the height of the section. (Shown in Figs. 18 to 20.)

I is the back water-holding section. This section is similar in construction to the section H with the exception that it has an opening $f'$ in but the front wall of its upper cross-bar $e'$. Said section I is, however, reversed as compared to the section H—i. e., its projection $j'$ extends forwardly and meets the similar projection of the section H and its opening $h'$ is disposed at the opposite side of said meeting projections with respect to the opening $h'$ of said section H.

K is the hot or flow pipe of a hot-water-heating system, which is connected to the water-holding section B, preferably in a detachable manner, as shown; L, the return or cold pipe of the system, similarly connected to the back section I and communicating with the rear opening $d^2$ thereof, and M a smoke-pipe, also connected to the section I and communicating with the opening $h'$ thereof.

The several water-holding sections B, E, F, G, H, and I of my heater are arranged on the base A in the relation shown in Figs. 10 and 11 and are held close together by longitudinal rods N, which are connected to lugs $n'$ on the front and back sections B and I, as shown in Figs. 1 and 10. From this it follows that when the rods N are disconnected from the lugs $n'$ any one of the water-holding sections may be readily removed and as readily replaced without detriment to the other sections.

When the water-holding sections are arranged on the base, as described, it will be observed that the sections B, E, F, and G form a combustion-chamber P, and the cross-bars $m$ of the sections E and F and the cross-bar $v$ of the section G rest in the lower portion of the chamber, so as to form hollow grate-bars. It will also be observed that the bars $u$ of the sections E and F and the vertical portion of the angular bar $a'$ of the section G form a longitudinal central partition which divides the space above the combustion-chamber into longitudinal flues Q, R, Figs. 10 and 11, and that the meeting projections $j'$ of the sections H and I divide the space at the back of the combustion-chamber P into a vertical flue S, which communicates with and extends downwardly from the rear end of the flue R, and a vertical flue T, which communicates with the flue S below the partition formed by the projections $j'$ and extends up to and communicates with the smoke-pipe M.

Below the partition formed by the projections $j'$ is a pocket U, at the bottom of which is a pivoted damper V. The pocket is designed to receive and hold soot, and when the damper is opened it will be observed that the soot will be dumped on the inclined plate and will pass down the same to the plate $b$. The damper may also be opened when desired to afford a direct draft from the ash-pit to the pipe M and to enable such a draft to carry off the dust incident to the shaking of the grate, presently described.

W designates longitudinal bars fixed in the ash-pit $c$ at opposite sides thereof and notched and grooved, as shown in Figs. 6 and 7, to permit the passage of air.

X X are the large rocking members of my improved grate, which respectively comprise a rock-shaft $a''$, journaled in the bars W, and fingers $b^7$, carried by and disposed at right angles to said shaft.

Y Y are the small rocking members of the grate, which respectively comprise a shaft $c^7$, journaled in the bars W, and fingers $d^7$, arranged at right angles to the shaft.

Z Z are stops on the bars W, which have for their purpose to limit the upward movement of the members X.

$A^7$ $A^7$ are stops on the bars W, designed to support the members Y in the position shown in Fig. 10.

$B^7$ $B^7$ are weighted arms fixed on the ends of the shafts $a''$ outside the heater and connected together by a bar $C^7$ and provided with weights $D^7$, and $E^7$ is a hand-lever fixed on one of the shafts $a''$ and also disposed outside the heater.

The grate members X Y are relatively arranged, as shown in Fig. 10—i. e., with the outer ends of the fingers of the members Y adjacent to the outer ends of the fingers of the members X. In virtue of this it will be observed that when the hand-lever $E^7$ is thrown into an inclined position the fingers of the members X will raise the fingers of the members Y, and thereby work out any clinkers that may be on the grate, and this without material loss of fire. It will also be observed that when the lever E⁷ is released the weights D⁷ will return the members X to the normal positions, (shown in Fig. 10,) while the members Y will gravitate to and rest on the stops A⁷.

The cross-bar $v$ of the water-holding section G, which, as before stated, forms a hollow grate-bar, is preferably shaped as shown in cross-section in order to fill the space between the adjacent rocking member of the grate and the back wall of the combustion-chamber P.

The arrangement of the hollow bars of the water-holding sections immediately above the rocking grate members is advantageous, since it enables said bars to hold up the coal while the grate is being shaken.

In the practical operation of my improved heater the course of the flames and products of combustion is from the combustion-chamber P through the horizontal flues Q and R and the vertical flues S and T in the order named to the smoke-pipe M, and in consequence it will be observed that my improved heater has a very large heating-surface and that practically all of the heat afforded by the consumption of fuel in the combustion-chamber is utilized to heat the water contained in the water-holding sections. The course of the water to be heated is from the return or cold pipe L through the sections I, H, G, F, E, and B in the order named to the flow or hot pipe K. In taking such course the water is at all times in contact with a highly-heated portion of one of the water-holding sections, and from this it follows that my improved heater is possessed of very large capacity.

The utilization of the front water-holding section to form part of the front wall of the heater and the back water-holding section to form part of the back wall of the heater is advantageous, since said walls are adapted to prevent the radiation of heat from the combustion-chamber.

In the modification shown in Figs. 21 to 24 it will be observed that the intermediate water-holding sections E³ and F³ each have two hollow vertical portions $u^3$, the intermediate water-holding section G³ has two hollow angular portions $a^3$, and the intermediate section H³ and the back section I³ each have two projections $j^3$. From this construction it follows that the modified heater has two longitudinal flues R³ above its combustion-chamber P³, a longitudinal central flue Q³ between the flues R³, vertical flues S³, communicating with and extending down from the rear ends of the flues R³, a vertical flue T³, disposed between the flues S³ and communicating with a smoke-pipe, a pocket U³, connecting the flues S³ T³ at their lower ends, and a damper V³, similar to the damper V, before described, at the bottom of the pocket U³.

In the modified construction the course of the flames and products of combustion is from the combustion-chamber P³ through the horizontal flue Q³, the horizontal flues R³, the vertical flues S³, and the vertical flue T³ in the order named to the smoke-stack, while the course of the water to be heated is from a return or cold pipe L through the sections I³, H³, G³, F³, E³, and B³ in the order named to a flow or hot pipe K³.

It will be readily appreciated from the foregoing that the construction shown in Figs. 21 to 24 is possessed of all of the advantages of that shown in Figs. 1 to 20 and also has an increased heating-surface due to the employment of three horizontal flues and two down-flues instead of two horizontal flues and one down-flue.

In both embodiments of my invention but two water-ports are cast in each section. This makes a saving of one port as compared with hot-water heaters extant, which have three water-ports in each section, and assures a much better circulation of water throughout the heater.

I have entered into a detailed description of the construction and relative arrangement of the parts embraced in the two embodiments of my invention herein disclosed in order to impart a full, clear, and exact understanding of said embodiments. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. A hot-water heater comprising a plurality of water-holding sections communicating with each other and detachably held together; several of the intermediate sections having hollow upright portions, lower hollow cross-bars, intermediate hollow cross-bars and upper hollow cross-bars, and all of the sections being arranged to form a combustion-chamber above the lower hollow cross-bars of said intermediate sections, a longitudinal flue disposed above the combustion-chamber and communicating with the rear portion of the same, and a longitudinal flue disposed above the combustion-chamber in the same horizontal plane as the first-mentioned longitudinal flue, and connected at its forward end with the said first-mentioned longitudinal flue, an upright flue disposed back of the combustion-chamber and leading downwardly from the second-mentioned longitudinal flue, and a second upright flue disposed back of the combustion-chamber in the same transverse plane as the first-mentioned upright flue, and connected at its lower end with said first-mentioned upright flue, and adapted to be connected to a smoke-conduit.

2. A hot-water heater comprising a plurality of hollow water-holding sections, communicating with each other and detachably connected together; several of the intermediate sections having hollow upright portions, lower hollow cross-bars, intermediate hollow cross-bars and upper hollow cross-bars, and all of the sections being arranged to form a combustion-chamber above the lower hollow cross-bars of said intermediate sections, a longitudinal flue disposed above the combustion-chamber and communicating with the rear portion of the same, and a longitudinal flue disposed above the combustion-chamber in the same horizontal plane as the first-mentioned longitudinal flue, and connected at its forward end with the said first-mentioned longitudinal flue, an upright flue disposed back of the combustion-chamber, and leading downwardly from the second-mentioned longitudinal flue; a second upright flue disposed back of the combustion-chamber and extending upwardly from the lower end of the first-mentioned upright flue, a pocket disposed back of the combustion-chamber and connecting the lower portions of the upright flues, a damper in the pocket, an ash-pit below the combustion-chamber, and a chute arranged to receive from the pocket and discharge into the ash-pit.

3. A hot-water heater comprising a plurality of hollow water-holding sections detachably held together and arranged to form a combustion-chamber; each of the said sections having a water-port in the center of its top and a water-port in the lower portion of one of its legs, and also having a hollow cross-bar connecting its legs and arranged at the bottom of the combustion-chamber, and an intermediate hollow cross-bar, a longitudinal flue disposed above the combustion-chamber and communicating with the rear portion of the same, a longitudinal flue disposed above the combustion-chamber in the same horizontal plane as the first-mentioned longitudinal flue and connected at its forward end with the said first-mentioned longitudinal flue, an upright flue disposed back of the combustion-chamber and leading downwardly from the second-mentioned longitudinal flue, and a second upright flue disposed back of the combustion-chamber in the same transverse plane as the first-mentioned upright flue, and connected at its lower end with said first-mentioned upright flue, and adapted to be connected with a smoke-conduit.

In testimony whereof I have hereunto set my hand in presence of two subscribing witnesses.

CLARENCE C. LONGARD.

Witnesses:
EDMUND P. ALLISON,
JOHN T. ROSS.